United States Patent
Shibaoka et al.

(10) Patent No.: US 8,406,558 B2
(45) Date of Patent: Mar. 26, 2013

(54) IMAGING APPARATUS, IMAGE PROCESSING APPARATUS, AND IMAGE PROCESSING METHOD

(75) Inventors: Syuuichi Shibaoka, Tokyo (JP); Keiichiro Yanagida, Tokyo (JP); Naoto Watanabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 12/883,259

(22) Filed: Sep. 16, 2010

(65) Prior Publication Data

US 2011/0134263 A1 Jun. 9, 2011

(30) Foreign Application Priority Data

Dec. 3, 2009 (JP) ................................ 2009-275839

(51) Int. Cl.
*G06K 9/40* (2006.01)
(52) U.S. Cl. ...................................................... 382/274
(58) Field of Classification Search ............. 348/208.12, 348/345, 346, 806, E3.048, E5.045; 351/159.52; 356/4.04, 609, 624; 359/319, 383, 426, 626, 359/698, 823; 382/255, 274; 396/79, 82, 396/93, 102
See application file for complete search history.

(56) References Cited

U.S. PATENT DOCUMENTS

| | | |
|---|---|---|
| 2008/0002061 A1 | 1/2008 | Miyazawa |
| 2010/0033596 A1 | 2/2010 | Kanemitsu et al. |
| 2010/0123809 A1* | 5/2010 | Egawa .......................... 348/280 |

FOREIGN PATENT DOCUMENTS

| | | | |
|---|---|---|---|
| JP | 10-233919 A | | 9/1998 |
| JP | 2003-101858 A | | 4/2003 |
| JP | 2003101858 A | * | 4/2003 |
| JP | 2009-044669 A | | 2/2009 |
| JP | 2009044669 A | * | 2/2009 |

OTHER PUBLICATIONS

Background Art Information Sheet provided by applicant (Jun. 29, 2010) (1 page total).

* cited by examiner

*Primary Examiner* — Gregory F Cunningham
(74) *Attorney, Agent, or Firm* — Posz Law Group, PLC

(57) ABSTRACT

According to one embodiment, an imaging apparatus includes an imaging unit, a focusing quantity calculating unit, a detail compensation amount calculating unit, and a detail adding unit. The focusing quantity calculating unit calculates a focusing quantity for every position in the subject image from a detail component. The compensation amount calculating unit calculates the detail compensation amount from the focusing quantity. The detail adding unit adds the detail component, which is compensated according to the detail compensation amount, to a low-frequency component of the image data.

20 Claims, 5 Drawing Sheets

US 8,406,558 B2

IMAGING APPARATUS, IMAGE PROCESSING APPARATUS, AND IMAGE PROCESSING METHOD

CROSS-REFERENCE TO RELATED APPLICATIONS

This application is based upon and claims the benefit of priority from the prior Japanese Patent Application No. 2009-275839, filed on Dec. 3, 2009; the entire contents of all of which are incorporated herein by reference.

FIELD

Embodiments described herein relate generally to an imaging apparatus, an image processing apparatus, and an image processing method.

BACKGROUND

It is difficult to attain a blurring effect (bokeh effect), around which a subject is positively brought into a non-focused state, in a popular digital camera, compared to a general silver salt camera. This is because, since the digital camera has an imaging element smaller in size than the silver salt camera, the blurring amount in a front focus and a rear focus becomes small, even if an equivalent f-value (equivalent focal length) or F-number (NA: Numerical Aperture) is equivalent. In recent years, a digital camera, particularly a digital camera mounted to a cellular phone, has been expected to take a photo with high image quality and high performance quality. Therefore, it has been expected that it can provide a blurring effect, similar to the effect obtained by a large-diameter lens, for example, in which a blurring occurs in the front focus and the rear focus. A technique of applying the blurring effect by a computation process in an image processing circuit has conventionally been proposed.

When a desired blurring effect is performed on an image, a technique of utilizing a function of image filter software on a personal computer (PC) has been known, for example. If the function described above is adapted to an imaging apparatus without performing any changes, a frame memory for storing image data for every frame and a circuit structure that can execute a complicated computation process with high speed are needed. A digital camera, particularly a digital camera mounted to a cellular phone, has strongly been demanded to be downsized, to be power saving, and to have reduced cost. Therefore, in an imaging apparatus having relatively smaller sensor size and a lens having a small diameter, it has been desired to realize a high performance quality due to the application of the blurring effect with a compact, power-saving, and cheap configuration.

DETAILED DESCRIPTION

In general, according to one embodiment, an imaging apparatus includes an imaging unit, a focusing quantity calculating unit, a detail compensation amount calculating unit, and a detail adding unit. The imaging unit generates image data from by capturing a subject image. The focusing quantity calculating unit calculates a focusing quantity for every position in the subject image from a detail component obtained from the image data. The compensation amount calculating unit calculates a detail compensation amount from the focusing quantity. The detail adding unit adds the detail component, which is compensated according to the detail compensation amount, to a low-frequency component of the image data.

Exemplary embodiments of an imaging apparatus, an image processing apparatus, and an image processing method will be explained below in detail with reference to the accompanying drawings. The present invention is not limited to the following embodiments.

Figure 1:
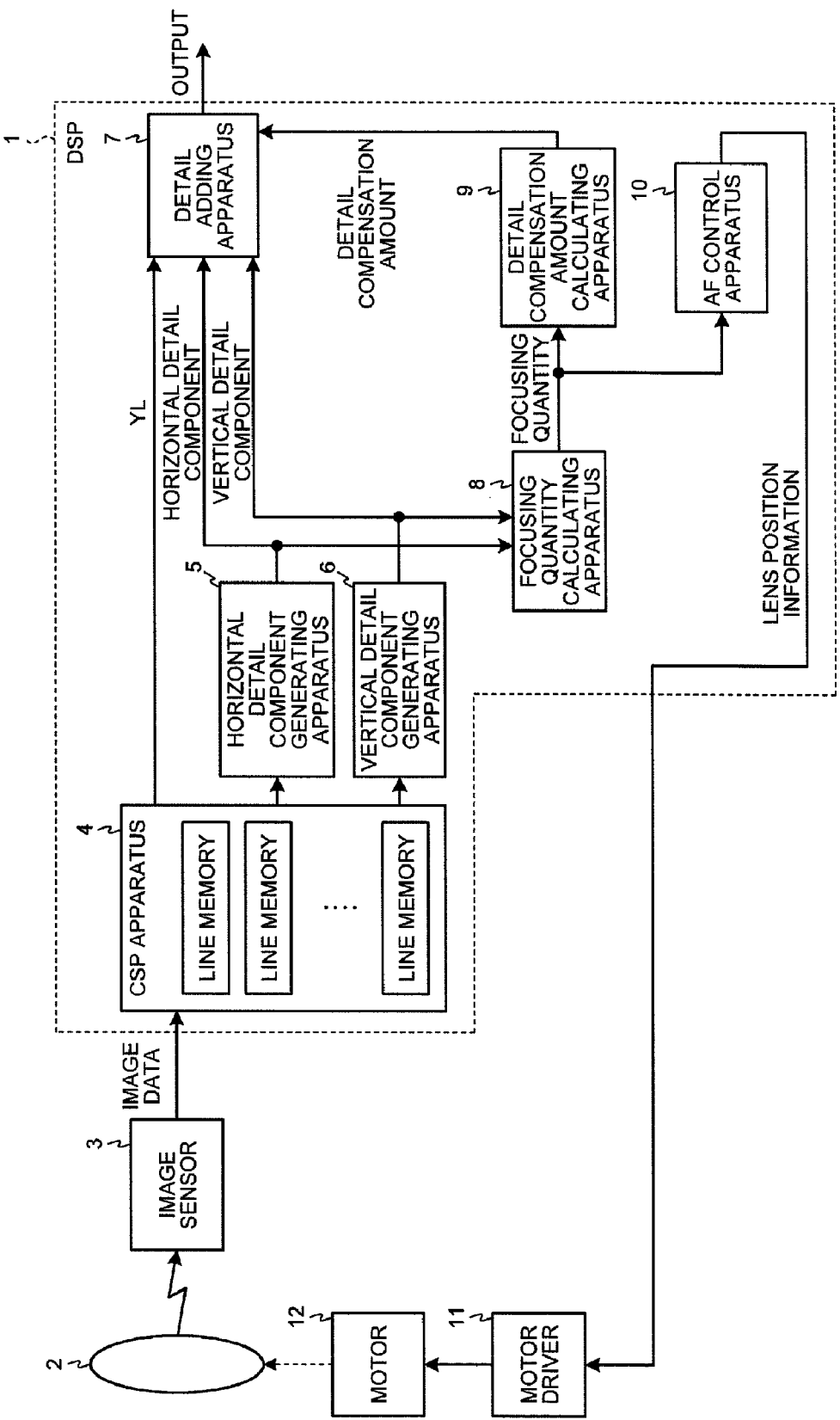
FIG. 1 is a block diagram illustrating a configuration of an imaging apparatus according to a first embodiment.

FIG. 1 is a block diagram illustrating a configuration of an imaging apparatus according to a first embodiment. The imaging apparatus includes a digital signal processor (DSP) (image processing apparatus) 1, an imaging optical system 2, an image sensor (imaging unit) 3, a motor driver 11, and a motor 12. The imaging optical system 2 takes light from the subject, and images an image of the subject onto the image sensor 3.

The DSP 1 includes a color separation (CSP) apparatus (color separating unit) 4, a horizontal detail component generating apparatus 5, a vertical detail component generating apparatus 6, a detail adding apparatus (detail adding unit) 7, a focusing quantity calculating apparatus (focusing quantity calculating unit) 8, a detail compensation amount calculating apparatus (detail compensation amount calculating unit) 9, and an autofocus (AF) control apparatus (focus control unit) 10.

The image sensor 3 converts light from the subject into a signal charge so as to capture the subject image. The image sensor 3 takes signal values of red (R), green (G), and blue (B) in the order corresponding to Bayer arrangement so as to generate image data.

Figure 2:
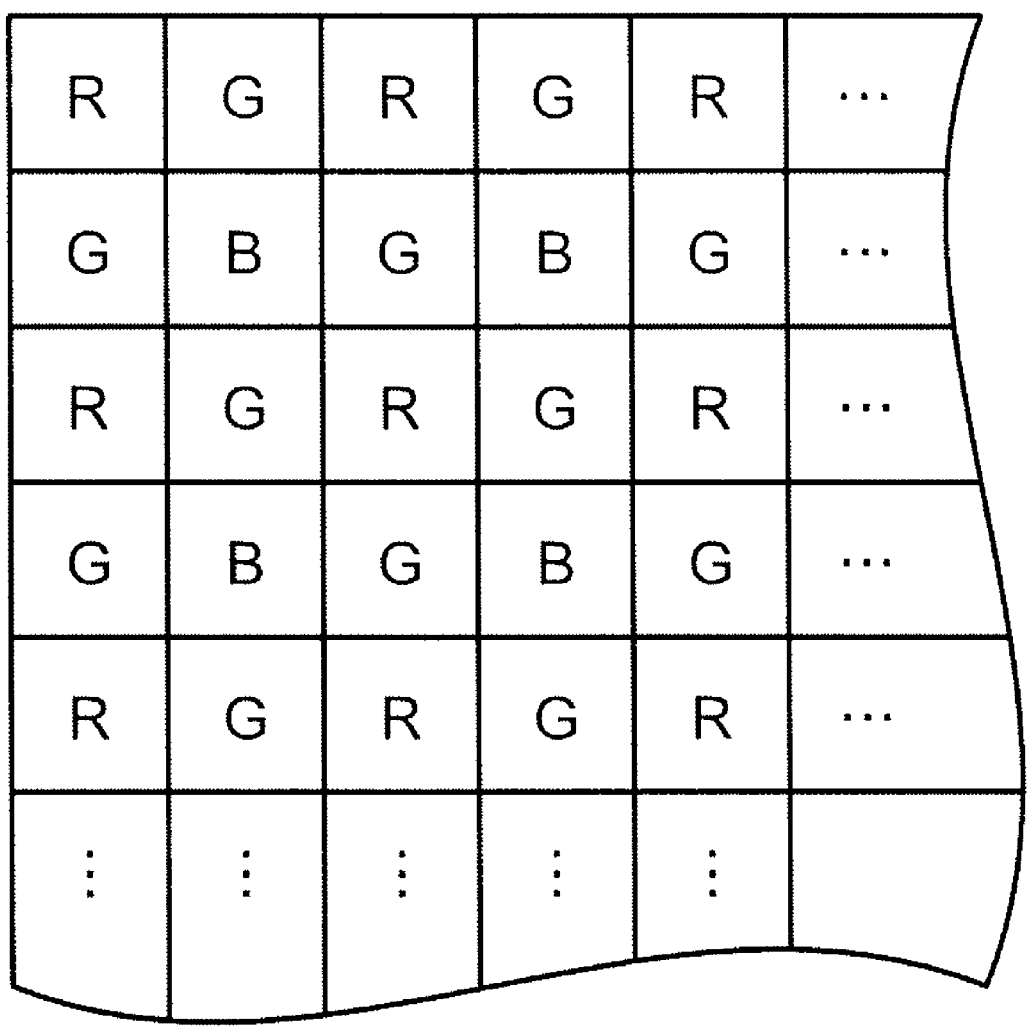
FIG. 2 is a view illustrating one example of a Bayer arrangement.

The CSP apparatus 4 has plural line memories that temporarily store the image data, which are transmitted in the order corresponding to the Bayer arrangement illustrated in FIG. 2. The CSP apparatus 4 appropriately reads the image data from the plural lines held in the line memories and the line immediately before the line inputted to the line memories, in a block, thereby performing a color separation process. The CSP apparatus 4 acquires a low-frequency component YL of the image data by the color separation process. The color separation is sometimes referred to as a color synchronization or de-mosaic.

The CSP apparatus 4 generates pixel values of R, G, and B from a pixel value of a pixel of interest at the center of the block and the average of the pixel values of the peripheral pixels of the same color. The CSP apparatus 4 acquires the low-frequency component YL of the image data by a process of adding the pixel values of the respective colors in a predetermined ratio such as 3:6:1, for example. The CSP apparatus 4 can acquire the signal of the low-frequency component YL not including a high-frequency component of a spatial frequency by a computation process in which the average of the pixel values of the peripheral pixels is used.

As illustrated in FIG. 2, in the Bayer arrangement, pixels (in this case, G pixels) mainly indicating the brightness information of the image are arranged like a checkerboard, so that the distance between the pixels indicating the brightness information becomes short. Accordingly, even in the image sensor 3 of a single chip, the brightness information of the image can be reproduced to a relatively high spatial frequency. The pixels (in this case, R pixels and B pixels) indicating mainly color information are arranged for every line on the portion left after the G pixels are arranged. With this, the unevenness is reduced in the color information of the image, and the color information can be reproduced to a relatively high spatial frequency. Since human's eyes are more sensitive to the spatial frequency of the brightness than the spatial frequency of the color, it is desirable that priority is given to the brightness resolution, wherein the pixels (in this case, G pixels) indicating mainly the brightness information of the image are desirably arranged close to each other.

The horizontal detail component is a detail component of the subject image in a horizontal direction. The horizontal detail generating apparatus 5 generates the horizontal detail component from the image data read in the horizontal direction of the line memory. The horizontal detail component generating apparatus 5 acquires the horizontal detail component by performing a band-pass filter process only to the brightness signal of the same color from the read image data, for example.

The vertical detail component is a detail component of the subject image in the vertical direction. The vertical detail component generating apparatus 6 generates the vertical detail component from the image data read in the vertical direction of the line memory. The vertical detail component generating apparatus 6 acquires the vertical detail component by performing a band-pass filter process only to the brightness signal of the same color from the read image data, for example.

The detail component may be either one of the component generated only from the brightness information of G that is the greatest in number in the respective colors, and the component generated by combining the brightness information pieces of R, G, and B. For example, when the detail component is taken from a monochromatic image, a high-pass filter process is executed to all pixels. On the other hand, when the similar process for all pixels is executed to color image data obtained from the image sensor 3 of a single chip, the brightness range of R, G, and B increases as the chroma of the subject is higher. Therefore, a correct detail component might not be acquired. Accordingly, it is desirable that the horizontal detail component generating apparatus 5 and the vertical detail component generating apparatus 6 execute the band-pass filter process only to the brightness signal of the same color in order to acquire the correct detail component.

The DSP 1 synthesizes the horizontal detail component and the vertical detail component to the low-frequency component YL as the detail component, whereby the output in which even the high frequency region of the spatial frequency is reproduced can be acquired.

The detail adding apparatus 7 adds the horizontal detail component and the vertical detail component compensated according to the detail compensation amount to the low-frequency component YL from the CSP apparatus 4, and outputs the resultant. The detail compensation amount reaches with the delay from the low-frequency component YL, the horizontal detail component, and the vertical detail component. Therefore, each signal of the low-frequency component YL, the horizontal detail component and the vertical detail component is delayed by being temporarily stored in a memory so as to be synchronized with the detail compensation amount.

The focusing quantity calculating apparatus 8 calculates the focusing quantity for every position in the subject image from the horizontal detail component and the vertical detail component.

The focusing quantity quantitatively represents the focusing condition. In the conventional apparatus, the sum of the absolute values of the differences between the adjacent pixels of the same color (R, G, and B) is adopted as the focusing quantity. The focusing quantity may be subject to a weighting according to the position on the screen. In an AF function, it is enough that one focusing quantity can be calculated every time one screen is scanned.

The imaging apparatus 1 according to the present embodiment adopts the value, which changes according to the position in the subject image, as the focusing quantity. The focusing quantity calculating apparatus 8 calculates the focusing quantity for every position in the subject image.

Figure 3:
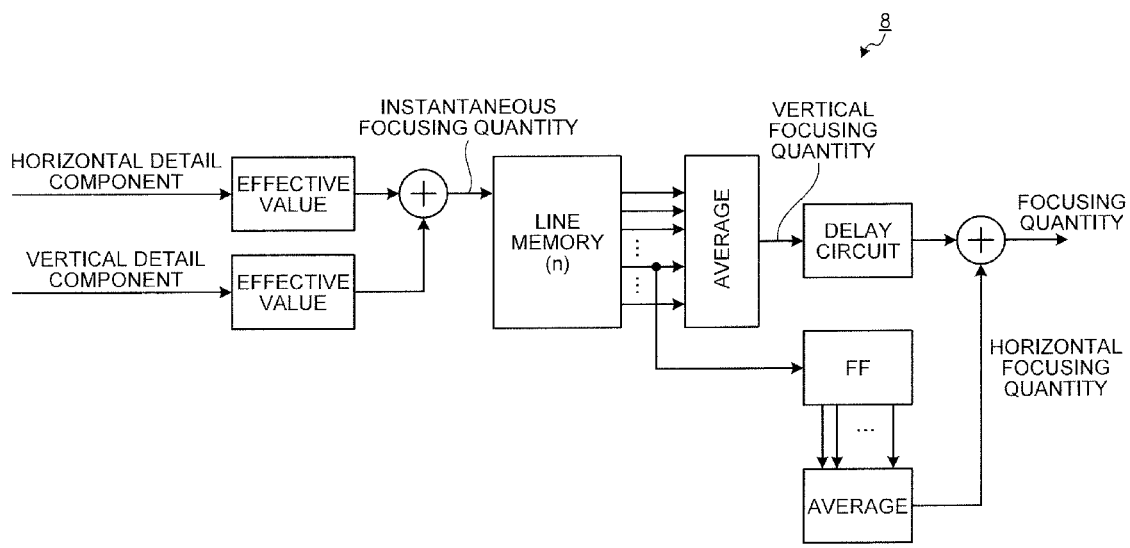
FIG. 3 is a block diagram illustrating an example of a configuration of a focusing quantity calculating apparatus.

FIG. 3 is a block diagram illustrating a configuration of the focusing quantity calculating apparatus 8. The focusing quantity calculating apparatus 8 adds an effective value taken from the horizontal detail component and an effective value taken from the vertical detail component so as to calculate an instantaneous focusing quantity. The focusing quantity calculating apparatus 8 delays the instantaneous focusing quantity by n line memories. Further, it calculates the average of the instantaneous focusing quantities by a low-pass filter process for n pixels arranged in the vertical direction of the subject image, and specifies the resultant as a vertical focusing quantity.

A flip-flop (FF) delays the instantaneous focusing quantity for the center line of n line memories. Further, it calculates the average of the instantaneous focusing quantities by a low-pass filter process for pixels arranged in the horizontal direction of the subject image, and specifies the resultant as a horizontal focusing quantity. The focusing quantity calculating apparatus 8 adds the horizontal focusing quantity and the vertical focusing quantity delayed by the delay circuit so as to acquire the focusing quantity for every position in the subject image. The focusing quantity calculating apparatus 8 sets the number of pixels n for obtaining the vertical focusing quantity and the horizontal focusing quantity to be, for example, 60 or more, for the image sensor 3 having the pixel number corresponding to a VGA. The focusing quantity calculating apparatus 8 may compensate the focusing quantity according to the brightness in order to suppress a significant change in the focusing quantity.

The focusing quantity for every cycle for scanning one screen is obtained by executing a process such as an integration for each focusing quantity calculated at the focusing quantity calculating apparatus 8. The DSP 1 may use the focusing quantity for every cycle for scanning one screen at the AF control apparatus 10. The focusing quantity used in the AF control apparatus 10 may be the one obtained by integrating the instantaneous focusing quantity for every one screen in the focusing quantity calculating apparatus 8.

The detail compensation amount calculating apparatus 9 calculates the detail compensation amount from the focusing quantity. The detail compensation amount calculating apparatus 9 calculates a higher value as the detail compensation amount, as the focusing quantity calculated by the focusing quantity calculating apparatus 8 is great. On the other hand, the detail compensation amount calculating apparatus 9 calculates a lower value as the detail compensation amount, as the focusing quantity calculated by the focusing quantity calculating apparatus 8 is small. The detail compensation amount calculating apparatus 9 calculates a plus detail compensation amount, when the focusing quantity is greater than a specified value that is set beforehand, while calculates a minus detail compensation amount, when the focusing quantity is smaller than a specified value that is set beforehand.

The detail compensation amount may be calculated in the detail compensation amount calculating apparatus 9 with either one of a linear process and a non-linear process. In the case of overcompensation, the non-linear process may be executed. The horizontal detail component and the vertical detail component added to the low-frequency component YL in the detail adding apparatus 7 are compensated by being multiplied by the detail compensation amounts calculated at the detail compensation amount calculating apparatus 9. The imaging apparatus 1 according to the present embodiment employs the value, which changes according to the position in the subject image, as the horizontal detail component and the vertical detail component.

Since the detail component is compensated by the detail compensation amount calculated according to the focusing quantity as described above, the detail amount is increased or decreased according to the focusing condition for every position in the subject image. For the portion in the subject image where the focusing quantity is great and which is well in focus, the detail amount is increased, while for the portion in the subject image where the focusing quantity is small and which is out focus, the detail amount is decreased. Thus, the blurring effect (bokeh effect), as in the large-diameter lens, in which blurring occurs in the front focus and the rear focus, can be obtained.

When the detail compensation amount calculated by the detail compensation amount calculating apparatus 9 is zero, the detail adding apparatus 7 adds a specified-amount multiple of the detail component to the low-frequency component YL, and outputs the resultant. At the portion where the detail compensation amount is minus, a numerical-value multiple of the detail component, which numerical value is smaller than the specified amount and not less than zero, is added to the low-frequency component YL so as to further increase the blurring amount. At the portion where the detail compensation amount is plus, a numerical-value multiple of the detail component, which numerical value is greater than the specified amount, is added to the low-frequency component YL so as to further decrease the blurring amount. When the focusing quantity is the specified amount, the detail compensation amount is zero, so that the portion where the compensated horizontal detail component and the vertical component are added has a standard detail amount.

The detail component for every position in the subject image can be compensated by the detail compensation amount calculated according to the focusing quantity. Therefore, a high performance quality due to the blurring effect can be obtained, compared to the case in which a fixed value that can be changed by a register is used as the detail compensation amount, or the case in which the detail compensation amount is changed in a frame unit according to a noise amount obtained from an analog-digital converter (ADC).

The AF control apparatus 10 outputs lens position information to execute a focus control according to the focusing quantity. The motor driver 11 drives the motor 12 according to the control of the AF control apparatus 10. The motor 12 moves the lens in the imaging optical system 2 through the drive. Thus, the AF function can be realized.

Figure 5:
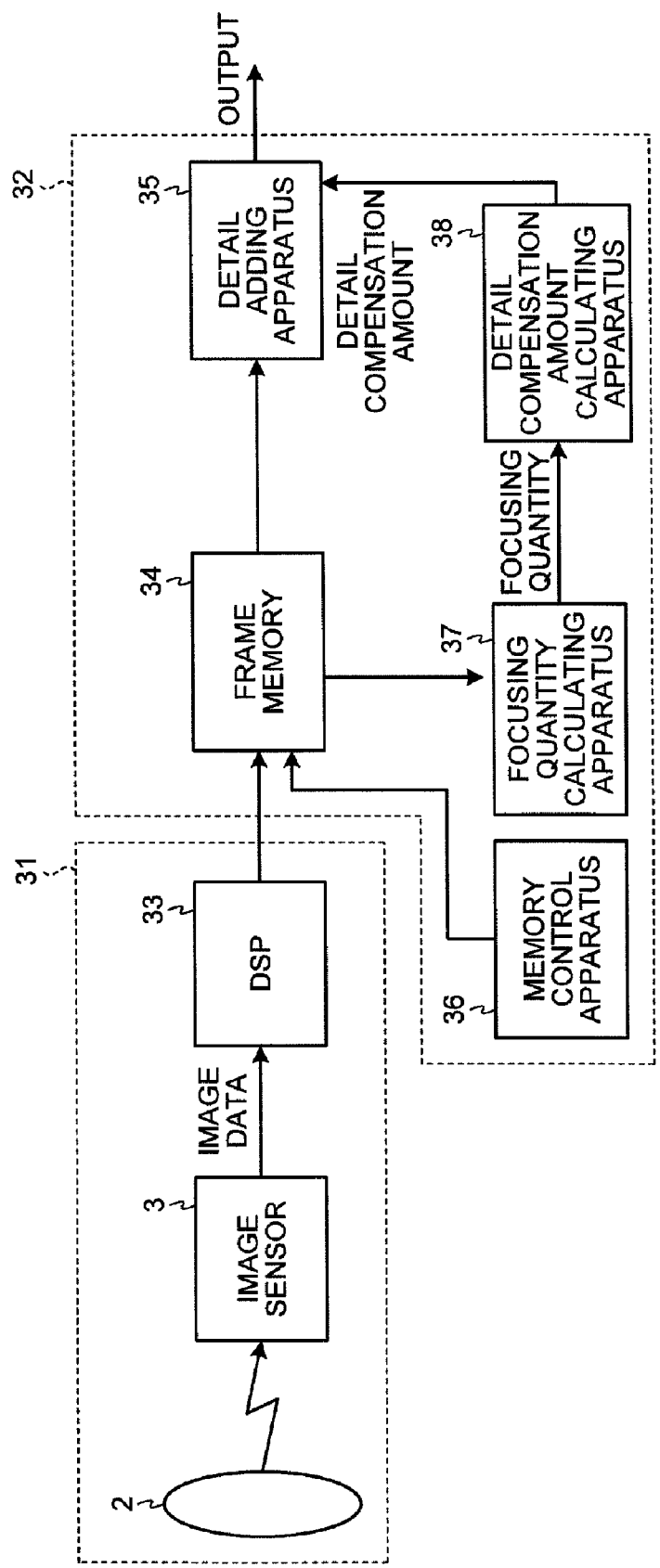
FIG. 5 is a block diagram illustrating a configuration of an imaging apparatus according to a comparative example.

FIG. 5 is a block diagram illustrating a configuration of an imaging apparatus according to a comparative example of the present embodiment. The comparative example includes a combination of a PC-derived portion 32 corresponding to the configuration applied to carry out the blurring effect by image filter software on a PC, and a camera-derived portion 31 corresponding to a configuration of a conventional camera. The camera-derived portion 31 includes an imaging optical system 2, an image sensor 3, and a DSP 33. The DSP 33 is a microcomputer for an image process, or a general-purpose DSP. The PC-derived portion 32 includes a frame memory 34, a detail adding apparatus 35, a memory control apparatus 36, a focusing quantity calculating apparatus 37, and a detail compensation amount calculating apparatus 38.

The frame memory 34 stores image data for each frame. The detail adding apparatus 35 adds the detail component, which is compensated according to the detail compensation amount, to the image data read from the frame memory 34, and outputs the resultant. The memory control apparatus 36 controls the frame memory 34. The focusing quantity calculating apparatus 37 calculates the focusing quantity for every position in the subject image from the image data read from the frame memory 34. The detail compensation amount calculating apparatus 38 calculates the detail compensation amount from the focusing quantity.

In the comparative example, an enormous memory capacity is allocated to the frame memory 34 in order to store the image data for every frame. The detail adding apparatus 35, the memory control apparatus 36, the focusing quantity calculating apparatus 37, and the detail compensation amount calculating apparatus 38 all need a circuit that can execute a complicated computation process with high speed for the image data for every frame. Therefore, the configuration provided for applying the blurring effect such as a memory and a computation circuit has a large scale, high power consumption, and increased cost.

In the imaging apparatus according to the present embodiment, the line memory mounted to the CSP apparatus 4 can be for 2 lines to 9 lines, for example. Therefore, the memory can greatly be reduced, compared to the case in which the frame memory 34 is mounted. The detail adding apparatus 7, the focusing quantity calculating apparatus 8, and the detail compensation amount calculating apparatus 9 can greatly reduce the data amount handled in one computation process, compared to the comparative example, so that the circuit scale can be reduced. Since the memory and the circuit can be downsized, a power-saving and cheap structure can be attained. Thus, the present embodiment provides an effect that a high performance quality due to the blurring effect can be realized with a compact, power-saving, and cheap structure.

The functions of extracting the low-frequency component YL, generating the horizontal detail component and the vertical detail component, and adding the detail component are employed in many DSPs. Therefore, the circuit structure in the present embodiment can be realized without greatly increasing the scale to the conventional circuit structure. In the present embodiment, the common focusing quantity calculating apparatus 8 is used for calculating the focusing quantity to obtain the blurring effect and for calculating the focusing quantity for AF. Accordingly, the blurring performance function and the AF function are both provided with a small circuit scale.

The present embodiment is useful to the case in which a size of an imaging element is small and a sensor function and a signal processing function are monolithic, or to the case in which a demand for a reduced size and power saving is high, and the suppression in the circuit scale is demanded, such as for a cellular phone, even if there are plural chips.

Figure 4:
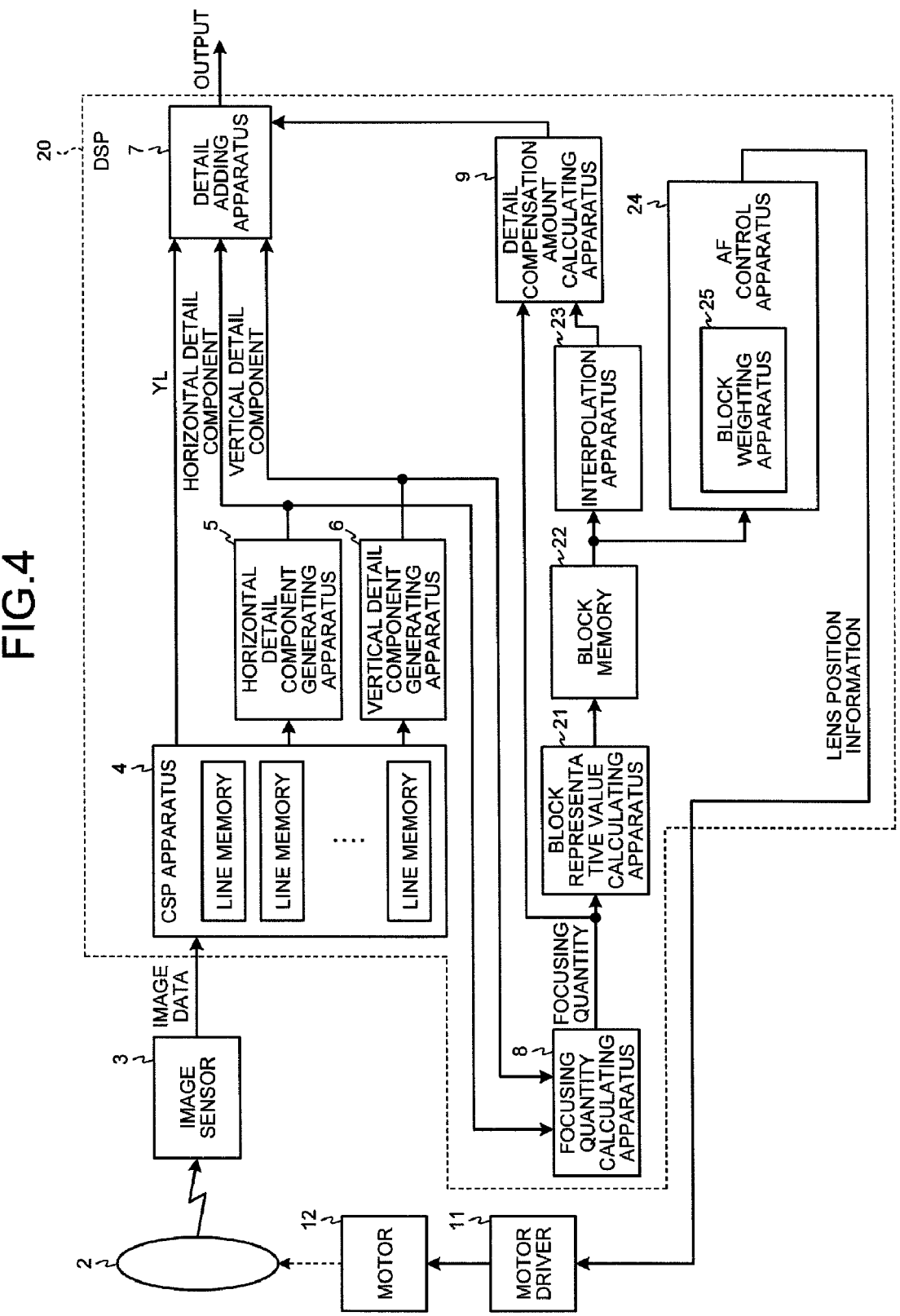
FIG. 4 is a block diagram illustrating a configuration of an imaging apparatus according to a second embodiment.

FIG. 4 is a block diagram illustrating a configuration of an imaging apparatus according to a second embodiment. In the present embodiment, a DSP 20 calculates the detail compensation amount according to the focusing quantity subject to an interpolation process. The components same as those in the first embodiment are identified by the same numerals, and the description will not be repeated.

The DSP 20 includes, in addition to the components in the DSP 1 (see FIG. 1) in the first embodiment, a block representative value calculating apparatus (block representing value calculating unit) 21, a block memory 22, and an interpolation apparatus (interpolation unit) 23. An AF control apparatus 24 includes a block weighting apparatus (block weighting unit) 25.

The block representative value calculating apparatus 21 calculates a representative value of a focusing quantity for every block of the subject image from the focusing quantity calculated by the focusing quantity calculating apparatus 8. The block memory 22 stores the representative value calculated by the block representative value calculating apparatus 21. The representative value is derived through the integration of the focusing quantity for each block obtained by dividing the subject image in n×m (n and m are optional natural number). An average value of the focusing quantities in the block or a center value (median) may be used as the representative value, for example.

The interpolation apparatus 23 executes an interpolation process of the focusing quantity according to the representative value. A bi-cubic or a linear interpolation is employed as an interpolation in the interpolation apparatus 23. The representative value stored in the block memory 22 is the value calculated based upon the focusing quantity of the frame immediately before the current frame. The interpolation apparatus 23 executes the interpolation process for the focusing quantity of the current image by using the representative value calculated from the focusing quantity of the frame immediately before the current frame. Considering the performance that the correlation in each frame in the focusing quantity of the image is relatively strong, and there is a little difference in the focusing quantity per a block unit, it is conceived that it is no difficulty in using the representative value of the frame immediately before the current frame in the interpolation process for the current focusing quantity. Compared to the case in which the representative value of the current frame is used for the interpolation process for the current focusing quantity, there is little difference in the effect, and further, a delay element for synchronization is unnecessary in the detail adding apparatus 7. Therefore, the memory capacity can significantly be reduced.

The detail compensation amount calculating apparatus 9 calculates the detail compensation amount according to the focusing quantity calculated in the focusing quantity calculating apparatus 8 and the focusing quantity that is subject to the interpolation process in the interpolation apparatus 23. The detail component is compensated by the detail compensation amount thus acquired, whereby the blurring effect, as in the large-diameter lens, in which blurring occurs in the front focus and the rear focus, can be obtained.

Since the detail compensation amount is calculated by adding the focusing quantity that is subject to the interpolation process, the significant change in the detail compensation amount can be suppressed. In particular, the smoothness in the vertical direction of the subject image is affected by the number of lines in the line memory. Even in case where the line memory has about 9 lines at most, the number of lines included in one block is set to be at least about 60 lines, whereby the detail compensation amount can more smoothly be changed. When the smoothness in the change of the detail compensation amount is excessive, the image can be rather unnatural. In the present embodiment, not only the focusing quantity that is subject to the interpolation process but also the current focusing quantity are used for calculating the detail compensation amount, whereby a more natural image can be obtained.

The block weighting apparatus 25 executes a weighting to the focusing quantity according to the representative value for each block. The AF control apparatus 24 executes a focus control according to the focusing quantity to which the weighting is executed by the block weighting apparatus 25. It is popular in the AF operation to make a focus adjustment by performing the weighting to the nearest portion or the fixed position of the subject image. Since the representative value for every block is used as the focusing quantity, the AF operation described above can easily be executed. In the present embodiment, the common block memory 22 is used for the interpolation process of the focusing quantity in the blurring effect and for the weighting to the focusing quantity in the AF. Therefore, the blurring performance function and the AF function can be realized with a small circuit scale.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging apparatus comprising:
   an imaging unit configured to generate image data by capturing an image of a subject;
   a focusing quantity calculating unit configured to calculate a focusing quantity for every position in the subject image from a detail component obtained from the image data;
   a detail compensation amount calculating unit configured to calculate a detail compensation amount from the focusing quantity; and
   a detail adding unit configured to add the detail component, which is compensated according to the detail compensation amount, to a low-frequency component of the image data.

2. The imaging apparatus according to claim 1, wherein the focusing quantity calculating unit calculates the focusing quantity from a horizontal detail component, which is the detail component in the horizontal direction of the subject image, and a vertical detail component, which is the detail component in the vertical direction of the subject image.

3. The imaging apparatus according to claim 1, further comprising:
   a focus control unit configured to execute a focus control according to the focusing quantity.

4. The imaging apparatus according to claim 1, further comprising:
   a block representative value calculating unit configured to calculate a representative value of the focusing quantity for every block of the subject image; and
   an interpolation unit configured to execute an interpolation process to the focusing quantity according to the representative value, wherein
   the detail compensation amount calculating unit calculates the detail compensation amount according to the focusing quantity calculated by the focusing quantity calculating unit and the focusing quantity that is subject to the interpolation process by the interpolation unit.

5. The imaging apparatus according to claim 3, further comprising:
a block representative value calculating unit configured to calculate a representative value of the focusing quantity for every block of the subject image; and
a block weighting unit configured to execute a weighting to the focusing quantity according to the representative value for every block, wherein
the focus control unit executes the focus control according to the focusing quantity to which the weighting is executed.

6. The imaging apparatus according to claim 1, further comprising:
a color separation unit configured to acquire the low-frequency component of the image data through the execution of a color separation process.

7. An image processing apparatus comprising:
a focusing quantity calculating unit configured to calculate a focusing quantity for every position of a subject image from a detail component of image data generated by capturing the subject image;
a detail compensation amount calculating unit configured to calculate a detail compensation amount from the focusing quantity; and
a detail adding unit configured to add the detail component, which is compensated according to the detail compensation amount, to a low-frequency component of the image data.

8. The image processing apparatus according to claim 7, wherein
the focusing quantity calculating unit calculates the focusing quantity from a horizontal detail component, which is the detail component in the horizontal direction of the subject image, and a vertical detail component, which is the detail component in the vertical direction of the subject image.

9. The image processing apparatus according to claim 7, further comprising:
a focus control unit configured to execute a focus control according to the focusing quantity.

10. The image processing apparatus according to claim 7, further comprising:
a block representative value calculating unit configured to calculate a representative value of the focusing quantity for every block of the subject image; and
an interpolation unit configured to execute an interpolation process to the focusing quantity according to the representative value, wherein
the detail compensation amount calculating unit calculates the detail compensation amount according to the focusing quantity calculated by the focusing quantity calculating unit and the focusing quantity that is subject to the interpolation process by the interpolation unit.

11. The image processing apparatus according to claim 10, wherein
the interpolation unit executes the interpolation process by using the representative value calculated from the focusing quantity of the frame immediately before the current frame.

12. The imaging apparatus according to claim 9, further comprising:
a block representative value calculating unit configured to calculate a representative value of the focusing quantity for every block of the subject image; and
a block weighting unit configured to execute a weighting to the focusing quantity according to the representative value for every block, wherein
the focus control unit executes the focus control according to the focusing quantity to which the weighting is executed.

13. The imaging apparatus according to claim 7, further comprising:
a color separation unit configured to acquire the low-frequency component of the image data through the execution of a color separation process.

14. The image processing method comprising:
calculating a focusing quantity for every position in a subject image from a detail component of image data generated by capturing the subject image;
calculating a detail compensation amount from the focusing quantity; and
adding the detail component, which is compensated according to the detail compensation amount, to a low-frequency component of the image data.

15. The image processing method according to claim 14, wherein
the focusing quantity is calculated from a horizontal detail component, which is the detail component in the horizontal direction of the subject image, and a vertical detail component, which is the detail component in the vertical direction of the subject image.

16. The image processing method according to claim 14, wherein
a focus control according to the focusing quantity is executed.

17. The image processing method according to claim 14, further comprising:
calculating a representative value of the focusing quantity for every block of the subject image; and
executing an interpolation process to the focusing quantity according to the representative value, wherein
the detail compensation amount is calculated according to the focusing quantity calculated and the focusing quantity that is subject to the interpolation process.

18. The image processing method according to claim 17, wherein
the interpolation process is executed by using the representative value calculated from the focusing quantity of the frame immediately before the current frame.

19. The image processing method according to claim 16, further comprising:
calculating a representative value of the focusing quantity for every block of the subject image; and
executing a weighting to the focusing quantity according to the representative value for every block, wherein
the focus control is executed according to the focusing quantity to which the weighting is executed.

20. The image processing method according to claim 14, wherein
the low-frequency component of the image data is acquired by executing a color separation process.

\* \* \* \* \*